United States Patent
Miura et al.

(10) Patent No.: US 6,816,450 B2
(45) Date of Patent: Nov. 9, 2004

(54) OPTICAL PICKUP APPARATUS THAT EMITS TWO LIGHT BEAMS HAVING TWO DIFFERENT WAVELENGTHS

(75) Inventors: Akira Miura, Saitama (JP); Yoshiharu Suzuki, Saitama (JP)

(73) Assignee: Pioneer Corporation, Tokyo (JP)

(*) Notice: Subject to any disclaimer, the term of this patent is extended or adjusted under 35 U.S.C. 154(b) by 396 days.

(21) Appl. No.: 09/863,466

(22) Filed: May 24, 2001

(65) Prior Publication Data

US 2001/0048654 A1 Dec. 6, 2001

(30) Foreign Application Priority Data

May 25, 2000 (JP) .................................... P.2000-155358

(51) Int. Cl.[7] .................................................. G11B 7/00
(52) U.S. Cl. ................................. 369/112.29; 369/121
(58) Field of Search ..................... 369/112.01, 112.18, 369/112.19, 112.21, 112.25, 112.26, 112.28, 121, 112.29; 359/618, 641

(56) References Cited

U.S. PATENT DOCUMENTS 5,940,360 A * 8/1999 Choi ..................... 369/112.04
5,995,473 A * 11/1999 Choi ..................... 369/112.19
5,999,509 A * 12/1999 Sugiura et al. ........ 369/112.17
6,031,667 A * 2/2000 Sugiura et al. ............. 359/618

FOREIGN PATENT DOCUMENTS

JP            10-255274         9/1998

* cited by examiner

Primary Examiner—Paul W. Huber
(74) Attorney, Agent, or Firm—Sughrue Mion, PLLC

(57) ABSTRACT

The optical pickup apparatus 100 uses a semiconductor laser element 50 integrated a first light emission source 36 for emitting a first laser beam with a second light emission source 40 for emitting a second laser beam, of which wavelength is different from that of the first laser beam. The optical pickup apparatus 100 is constructed so that a first half mirror functional surface 52b and a second half mirror functional surface 52c are provided in a beam splitter 52 to match an optical path in which the first laser beam passes through the first half mirror functional surface 52b of the beam splitter 52 and then is reflected at the second half mirror functional surface 52c and again is emitted from the first half mirror functional surface 52b to be directed toward a bifocal lens 54 with an optical path in which the second laser beam is reflected at the first half mirror functional surface 52b to be directed toward the bifocal lens 54.

11 Claims, 11 Drawing Sheets

IMAGE HEIGHT
(DISTANCE FROM OPTICAL AXIS)

FIG. 6A
TRANSMISSION / REFLECTION CHARACTERISTICS OF FIRST HALF MIRROR FUNCTIONAL SURFACE

|  | FIRST LASER BEAM (650nm) | SECOND LASER BEAM (780nm) |
|---|---|---|
| TRANSMITTANCE (T) CHARACTERISTIC | 100% | 50% |
| REFLECTION (R) CHARACTERISTIC | 0% | 50% |

FIG. 6B
TRANSMISSION / REFLECTION CHARACTERISTICS OF SECOND HALF MIRROR FUNCTIONAL SURFACE

|  | FIRST LASER BEAM (650nm) | SECOND LASER BEAM (780nm) |
|---|---|---|
| TRANSMITTANCE (T) CHARACTERISTIC | 50% | 100% |
| REFLECTION (R) CHARACTERISTIC | 50% | 0% |

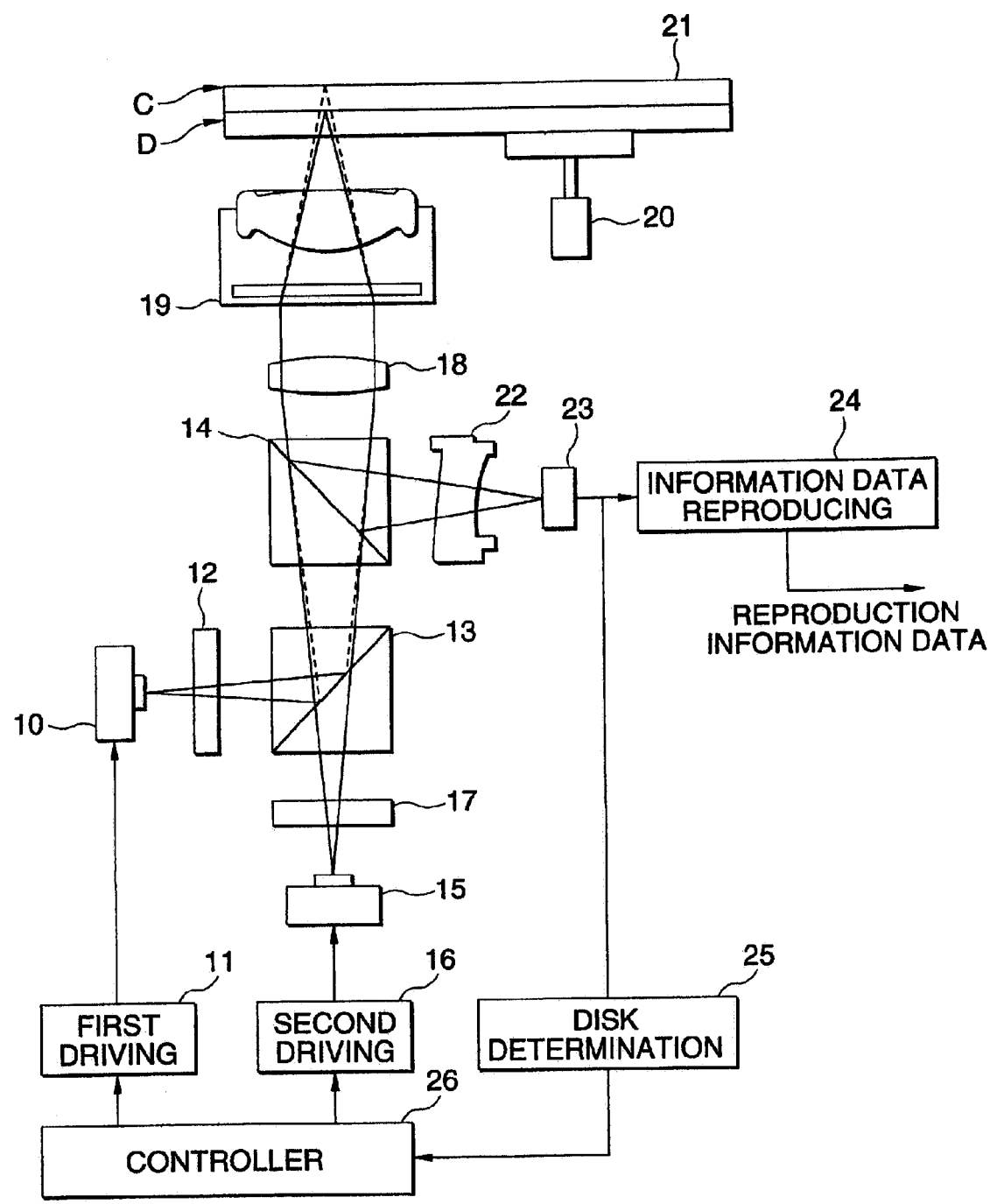

ated to an information record surface of the DVD, the protective layer
OPTICAL PICKUP APPARATUS THAT EMITS TWO LIGHT BEAMS HAVING TWO DIFFERENT WAVELENGTHS The present disclosure relates to the subject matter contained in Japanese Patent Application No. 2000-155358 filed May 25, 2000, which is incorporated herein by reference in its entirety.

BACKGROUND OF THE INVENTION

1. Field of the Invention

The present invention relates to an optical pickup apparatus enabling to read two or more kinds of recording medium, which are different in read wavelength, such as a compatible optical pickup apparatus for DVD/CD and the like. Particularly, the present invention relates to an optical pickup apparatus using a semiconductor laser element formed of a one-chip laser diode emitting two laser beams, which are different in wavelength from each other.

2. Description of the Related Art

Conventionally, a DVD/CD compatible reproducing apparatus sharing an optical pickup for a CD reproducing apparatus and a DVD reproducing apparatus has actively been proposed, and there are a DVD/CD compatible reproducing apparatus using a one-wavelength/bifocal optical pickup and a DVD/CD compatible reproducing apparatus using a two-wavelengths/bifocal optical pickup.

When a CD is compared with a DVD, a thickness of a protective layer of the DVD is about one-half (0.6 mm) that of a protective layer of the CD. Thus, in case of reproducing both of optical disks using a unifocal optical pickup, when a light beam is gathered so as to achieve optimization to an information record surface of the DVD, the protective layer of the CD, through which the light beam passes, is thicker than that of the DVD, therefore, aberration such as spherical aberration and the like occurs in the light beam so that the light beam cannot be gathered optimally to an information record surface of the CD. Also, since the CD is different from the DVD in a size of information pits formed for recording, it is necessary to form a beam spot with optimum size to the respective information pits on the information record surface of the CD or the DVD in order to exactly read the respective information pits.

Also, a size of the beam spot is proportional to a ratio of a wavelength of the light beam to a numerical aperture of an objective lens for gathering the light beam to the information record surface. That is, when it is assumed that a wavelength of the light beam is constant, the beam spot becomes smaller as the numerical aperture becomes larger. Accordingly, in the case of reproducing the CD and the DVD by the unifocal optical pickup, when it is constructed so that a wavelength of the light beam is constant and the numerical aperture is adapted for, for example, the information pits of the DVD, the beam spot becomes too small with respect to the information pits of the CD and distortion occurs in a reproduction signal on reproducing the CD and an exact reading becomes difficult. Hence, a DVD/CD compatible reproducing apparatus using a bifocal optical pickup enabling to focus at different positions on the same straight line and applying two laser beams for forming a beam spot with a proper size in correspondence with a size of each information pit has become the mainstream.

For example, an optical pickup apparatus shown in FIG. 13 is a DVD/CD compatible reproducing apparatus in which an optical path of a light beam emitted from a first light source 10 for CD and an optical path of a light beam emitted from a second light source 15 for DVD are mixed by a first beam splitter 13 acting as a prism to apply any one of two light beams emitted from the two light source, respectively, to a bifocal lens comprising an objective lens and a diffraction element, and a configuration and operation will be described briefly.

In FIG. 13, the first light source 10 generates a laser beam (shown by a broken line) with a wavelength (780 nm) most suitable for an information reading from a CD according to a driving signal from a first driving circuit 11, and the laser beam is applied to the first beam splitter 13 through a grating 12 for generating three beams. The first beam splitter 13 reflects the laser beam emitted from the first light source 10 and guides the reflected light to a second beam splitter 14.

On the other hand, the second light source 15 placed at a 90° with respect to the first light source 10 generates a laser beam (shown by a solid line) with a wavelength (650 nm) most suitable for an information reading from a DVD according to a driving signal from a second driving circuit 16, and the laser beam is applied to the first beam splitter 13 through a grating 17. The first beam splitter 13 transmits the laser beam emitted from the second light source 15 and guides the laser beam to the second beam splitter 14.

The second beam splitter 14 guides the laser beam supplied through the first beam splitter 13, namely the laser beam emitted from the first light source 10 or the second light source 15 to a bifocal lens 19 through a collimator lens 18. The bifocal lens 19 gathers the laser beam from the second beam splitter 14 at one point to be information reading light beam and the information reading light beam is applied to an information record surface of an optical disk 21 rotated and driven by a spindle motor 20.

The laser beam emitted from the first light source 10 (shown by a broken line) is gathered by the bifocal lens 19 to focus on an information record surface C of the optical disk 21. Also, the laser beam emitted from the second light source 15 (shown by a solid line) is gathered by the bifocal lens 19 to focus on an information record surface D of the optical disk 21.

The reflected light occurring by applying the information reading light beam from the bifocal lens 19 to the optical disk 21 passes through the bifocal lens 19 and the collimator lens 18, is reflected at the second beam splitter 14, passes through a cylindrical lens 22, which is an astigmatism generation element, and is applied to a photodetector 23. The photodetector 23 generates a signal having a level corresponding to light intensity of the applied light and supplies the signal to an information data reproducing circuit 24 and a disk determination circuit 25 as a reading signal.

The information data reproducing circuit 24 generates a digital signal based on the obtained reading signal and further performs demodulation and error correction to the digital signal to reproduce information data. The disk determination circuit 25 identifies a kind of the optical disk 21 based on a size of a beam spot formed at the time of applying a laser beam to the optical disk 21 and supplies the kind to a controller 26 as disclosed in, for example, Japanese Unexamined Patent Application No. Hei. 10-255274 by the present applicant. According to a disk identification signal, the controller 26 drives and controls any one of the first driving circuit 11 and the second driving circuit 16 selectively in a drive state. The controller 26 drives only the first driving circuit 11 when a disk identification signal indicating a CD is obtained from the disk determination circuit 25. Therefore, the laser beam emitted from the first light source 10 is applied to the optical disk 21 through an optical system comprising the grating 12, the first beam splitter 13, the second beam splitter 14, the collimator lens 18, and the bifocal lens 19. Then, the reflected light (return light) reflected at the information record surface of the optical disk 21 passes through the bifocal lens 19 and the collimator lens 18, and is reflected at the second beam splitter 14, and passes through the cylindrical lens 22, and is applied to the photodetector 23.

Also, the controller 26 drives only the second driving circuit 16 when a disk identification signal indicating a DVD is obtained from the disk determination circuit 25. Therefore, the laser beam emitted from the second light source 15 is applied to the optical disk 21 through an optical system comprising the grating 17, the first beam splitter 13, the second beam splitter 14, the collimator lens 18 and the bifocal lens 19. That is, it is constructed so that the first light source 10 for generating a laser beam having a wavelength most suitable for an information reading from the optical disk 21 with a relatively low recording density as the CD and the second light source 15 for generating a laser beam having a wavelength most suitable for an information reading from the optical disk 21 with a high recording density as the DVD are provided and the light source corresponding to the kind of the optical disk 21 targeted for reproduction is alternatively selected. Then, the reflected light (return light) reflected at the information record surface of the optical disk 21 passes through the bifocal lens 19 and the collimator lens 18, and is reflected at the second beam splitter 14, and passes through the cylindrical lens 22, and is applied to the photodetector 23.

As described above, the DVD/CD compatible reproducing apparatus requiring two light sources requires the prism to increase a cost compared with an optical pickup apparatus having one light source. When the first light source 10 is applied from one side of the first beam splitter 13, it is necessary to apply the second light source 15 from the other side perpendicular to the first light source 10 and thus, there is a problem that space for placing an optical system widen and the optical pickup apparatus becomes large.

SUMMARY OF THE INVENTION

The invention is implemented in view of the problem, and an object of the invention is to provide an optical pickup apparatus in correspondence with two wavelengths enabling to do miniaturization without using a prism.

In order to solve the above problem, an optical pickup apparatus according to a first aspect of the invention enabling to read information of a plurality of recording mediums having different reading wavelengths from each other, the optical pickup apparatus comprises:

a light emission unit including a first light emission source adapted to emit a first laser beam, and a second light emission source disposed adjacent to the first light emission source and adapted to emit a second laser beam whose wavelength is different from that of the first laser beam, and an photodetection unit; and a beam splitter having first and second half mirrors, wherein the beam splitter guides the first and second laser beams toward the recording medium and guides a reflected beam reflected at the recording medium toward the photodetection unit.

In a second aspect of the invention, the optical pickup apparatus according to the first aspect of the invention is provided wherein the first half mirror is disposed with respect to the second half mirrors so that:

the first laser beam emitted from the light emission unit is reflected at the first half mirror to be guided toward the recording medium; and the second laser beams emitted from the light emission unit passes the first half mirror, is reflected at the second half mirror, and passes through the first half mirror to be guided toward the recording medium.

An optical pickup apparatus according to a third aspect of the invention is the optical pickup apparatus according to any one of the first and second aspects of the invention wherein the first and second laser beam between the beam splitter and the recording medium have the same optical path.

An optical pickup apparatus according to a fourth aspect of the invention is the optical pickup apparatus according to the first aspect of the invention wherein the first and second half mirrors are inclined with respect to the first and second laser beams emitted from the light emission unit.

An optical pickup apparatus according to a fifth aspect of the invention is characterized in that in the optical pickup apparatus according to any one of the first to third aspects of the invention, wherein the first and second half mirrors are substantially parallel to each other.

An optical pickup apparatus according to a sixth aspect of the invention is characterized in that in the optical pickup apparatus according to any one of the first to fourth aspects of the invention, the first and second laser beams reflected at the recording medium passes through the first half mirror and passes through the second half mirror to be guided toward the photodetection unit.

An optical pickup apparatus according to a seventh aspect of the invention is characterized in that in the optical pickup apparatus according to the first to fifth aspects of the invention, a parallel flat plate adapted to provide astigmatism to the first and second laser beams reflected at the recording medium is fixed to the second half mirror.

BRIEF DESCRIPTION OF THE DRAWINGS

FIGS. 6A and 6B are diagrams showing transmission/reflection characteristics of first and second half mirror functional surfaces of a beam splitter used in the optical pickup apparatus of the invention.

FIG. 13 is a configuration diagram of an optical pickup apparatus in related art.

DETAILED DESCRIPTION OF THE PREFERRED EMBODIMENTS

Embodiments of the invention will be described below using an optical pickup apparatus for reproducing a DVD and a CD or a CDR with a different read wavelength as an example. Incidentally, recording medium to be reproduced are not limited to the DVD, the CD, and the CDR and the invention can be applied as long as there is an optical pickup apparatus for reproducing plural disks with a different read wavelength.

Figure 1:
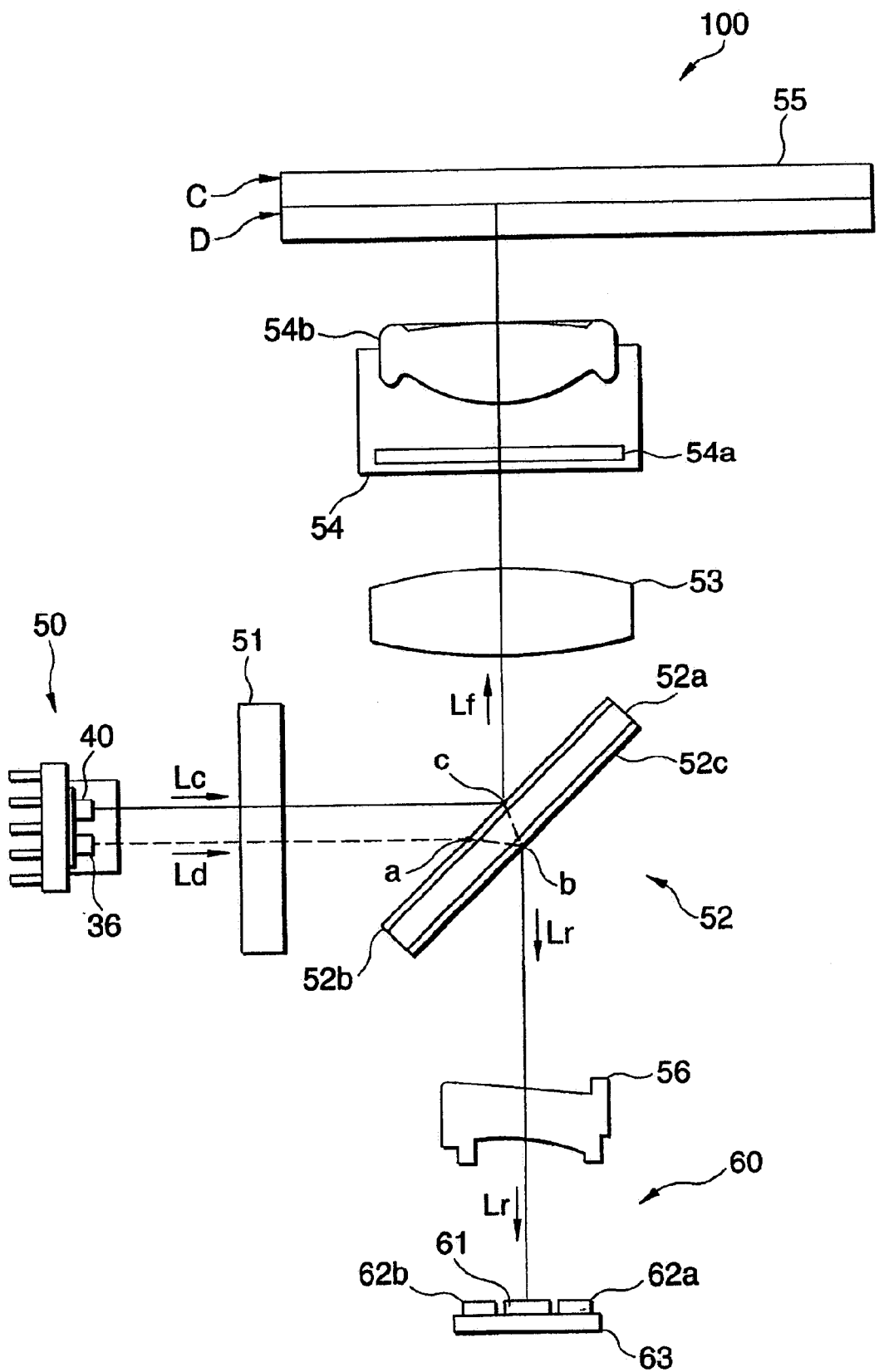
FIG. 1 is a configuration diagram of an optical pickup apparatus according to a first embodiment of the invention.

FIG. 1 is a main configuration diagram of an optical pickup apparatus 100 according to a first embodiment of the invention and a configuration of the optical pickup apparatus 100 will be described on the basis of the drawing.

The optical pickup apparatus 100 comprises a semiconductor laser element 50 for emitting laser beams of two wavelengths acting as light emission unit, a grating lens 51 for generating a pair of sub-beams for tracking error generation from the emitted laser beams, a beam splitter 52 having a half mirror functional surface for reflecting the laser beam emitted from the semiconductor laser element 50 to guide the laser beam to an optical disk 55 while transmitting the laser beam reflected from an information record surface of the optical disk 55 to guide the laser beam toward a photodetector 60, a collimator lens 53 for converting the laser beam into parallel light, a bifocal lens 54 for focusing the laser beams with different wavelengths to gather the laser beams to a predetermined position, respectively, a cylindrical lens 56 which is an astigmatism generation element, and the photodetector 60 which is photodetection unit.

Incidentally, in the embodiment, a focus servo adjustment is conducted by an astigmatism method and tracking servo adjustment is conducted by a three-beam method. Also, electric circuits such as a driving circuit of the semiconductor laser element 50 or a disk determination circuit are similar to those of a related art and, therefore, are omitted.

Figure 2:
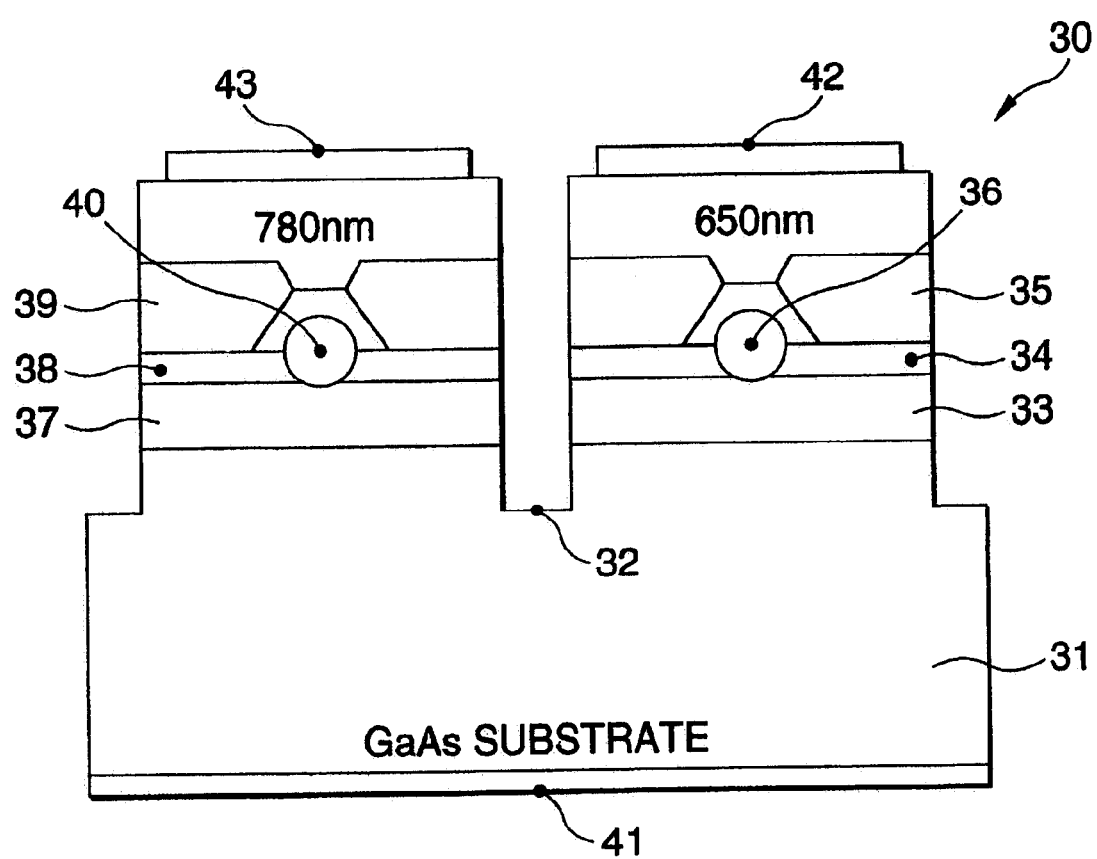
FIG. 2 is a structure view of a semiconductor laser element used in the optical pickup apparatus of the invention.
Figure 3:
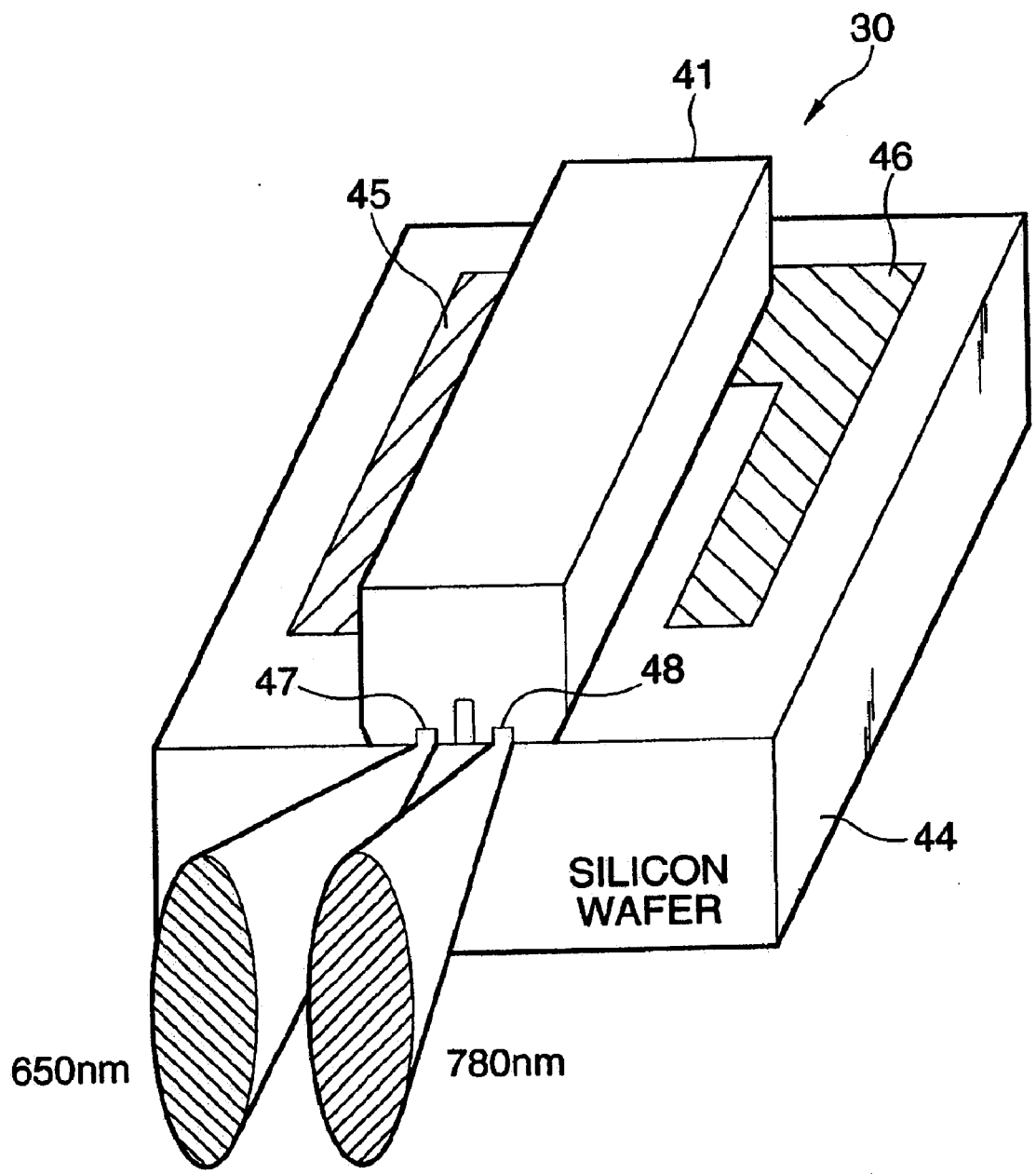
FIG. 3 is a sub-mount structure view of the semiconductor laser element used in the optical pickup apparatus of the invention.

The semiconductor laser element 50 is a one-chip laser diode 30 for emitting two wavelengths, which are a first laser beam with a wavelength of 650 nm for DVD reading and a second laser beam with a wavelength of 780 nm for CD and CDR reading. A structure of the laser diode is shown in FIG. 2 and FIG. 3. FIG. 2 is a sectional view of the one-chip laser diode 30 and FIG. 3 is a sub-mount view of the one-chip laser diode 30.

As shown in FIG. 2, the one-chip laser diode 30 has a structure in which an n-type $Al_xGa_yIn_{1-x-y}P$ layer 33, an $Al_xGa_yIn_{1-x-y}P$ active layer 34, and a p-type $Al_xGa_yIn_{1-x-y}P$ layer 35 are stacked on a GaAs substrate 31 with an outer size of the order of 300 μm×400 μm×100 to 120 μm and a first light emission part 36 acting as a first light emission source for emitting the first laser beam with a wavelength of 650 nm is formed in the center of the active layer 34 and also an n-type $Al_xGa_{1-x}As$ layer 37, an $Al_xGa_{1-x}As$ active layer 38, and a p-type $Al_xGa_{1-x}As$ layer 39 are stacked and a second light emission part 40 acting as a second light emission source for emitting the second laser beam with a wavelength of 780 nm is formed in the center of the active layer 38 and the two active layers 34, 38 with a thickness of about 4 μm are isolated by an isolated trench 32. Therefore, the first light emission part 36 and the second light emission part 40 have a structure spaced about 100 μm apart by the isolated trench 32.

Also, in the one-chip laser diode 30, a common electrode 41 is formed on the bottom side of the GaAs substrate 31 and an Au electrode 42 for the first light emission part 36 is formed on the top side of the first light emission source and an Au electrode 43 for the second light emission part 40 is formed on the top side of the second light emission source, respectively. That is, the one-chip laser diode 30 is the semiconductor laser element 50 in which one of the electrodes of the first and second light emission sources is formed as the common electrode.

Incidentally, a "one-chip" element generally means an element constructed so that laser beams of two wavelengths can be outputted by fabricating two active layers of different kinds on the one-chip with a selective growth method, but the invention is not limited to the this type. An element formed by disposing two laser elements for emitting a laser beam of one wavelength (two laser elements have different wavelengths from each other) in a hybrid manner, for example, on a silicon wafer, namely an element unitized by integrating two laser elements having one wavelength is also an target.

Also, as shown in FIG. 3, the one-chip laser diode 30 is used in sub-mount form placed on a silicon wafer 44 on which two Al electrodes 45, 46 are formed. That is, in the submount, the one-chip laser diode 30 with the common electrode 41 directed upward is placed on the silicon wafer 44 on which the Al electrode 45 for light emission element of 650 nm and the Al electrode 46 for light emission element of 780 nm are formed and the Au electrode 42 for the first light emission part 36 and the Au electrode 43 for the second light emission part 40 are soldered to the two Al electrodes 45, 46, respectively. The sub-mount is used by soldering lead wires (not shown) to the common electrode 41 and the two Al electrodes 45, 46.

Then, the first laser beam with a wavelength of 650 nm is emitted from a light emission window 47 when a predetermined voltage is applied between the common electrode 41 and the Al electrode 45, and the second laser beam with a wavelength of 780 nm is emitted from a light emission window 48 when a predetermined voltage is applied between the common electrode 41 and the Al electrode 46. Beam shapes of the first and second laser beams are elliptic shapes as shown in FIG. 3. Then, the one-chip laser diode 30 with a sub-mount shape is held in, for example, a case having a light emission window and a plurality of output terminals (not shown) and is used as the semiconductor laser element 50.

Next, optical paths of the first and second laser beams emitted from the semiconductor laser element 50 will be described.

In the semiconductor laser element 50, as described above, the first light emission part 36 for emitting the first laser beam with a wavelength of 650 nm and the second light emission part 40 for emitting the second laser beam with a wavelength of 780 nm are formed on the same chip at an interval of about 100 μm. Therefore, as shown in FIG. 1, an optical path of emission light Ld of the first laser beam emitted from the semiconductor laser element 50 toward the beam splitter 52 is somewhat different from an optical path of emission light Lc of the second laser beam emitted from the semiconductor laser element 50 toward the beam splitter 52. For example, when the first light emission part 36 is placed so that a main beam thereof matches with a center axis of an objective lens 54b, a main beam of the second light emission part 40 is located apart from the center axis of the objective lens 54b naturally. Accordingly, the first laser beam emitted from the first light emission part 36 is reflected at the beam splitter 52 to form an optical path passing through the center axis of the objective lens 54b, but the second laser beam emitted from the second light emission part 40 is reflected at the beam splitter 52 to form an optical path different from the center axis of the objective lens 54b. Incidentally, since any one of the first light emission part 36 and the second light emission part 40 is selectively driven, the optical paths of the first laser beam and the second laser beam are not formed at the same time.

In an optical system constructed of light sources and an objective lens generally, the light sources is placed on the center axis of the objective lens to be used. However, when one of the light sources deviates from the center axis of the objective lens as described above, an aberration due to an image height occurs. A relation between the image height and the aberration will be described using FIGS. 4 and 5.

Figure 4:
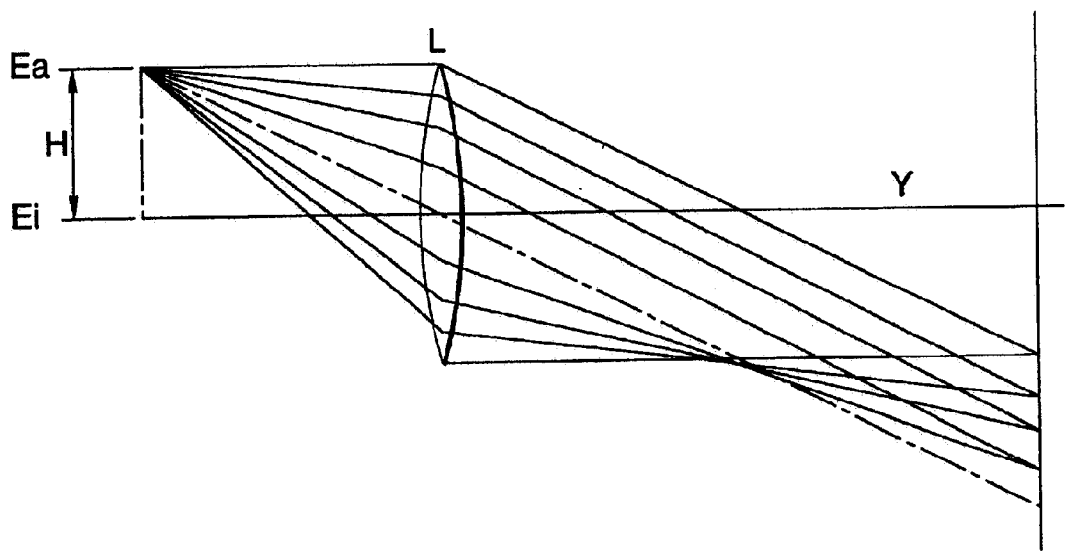
FIG. 4 is a diagram showing a relation between a light source and a center axis of a lens.

As shown in FIG. 4, it has been found that a diameter of a beam spot becomes smallest when a light source Ei is placed on a center axis Y of a lens L. Therefore, the light source Ei located on the center axis Y of the lens L is an ideal light emission point. However, when a center of the light source Ea does not match with the optical axis Y, an image height becomes H and an aberration occurs. It is desirable to reduce the aberration as much as possible because the further the center of the light source Ea is from the center axis of the lens L, the larger the diameter of the beam spot becomes, and the aberration has a bad influence on a reading signal.

Figure 5:
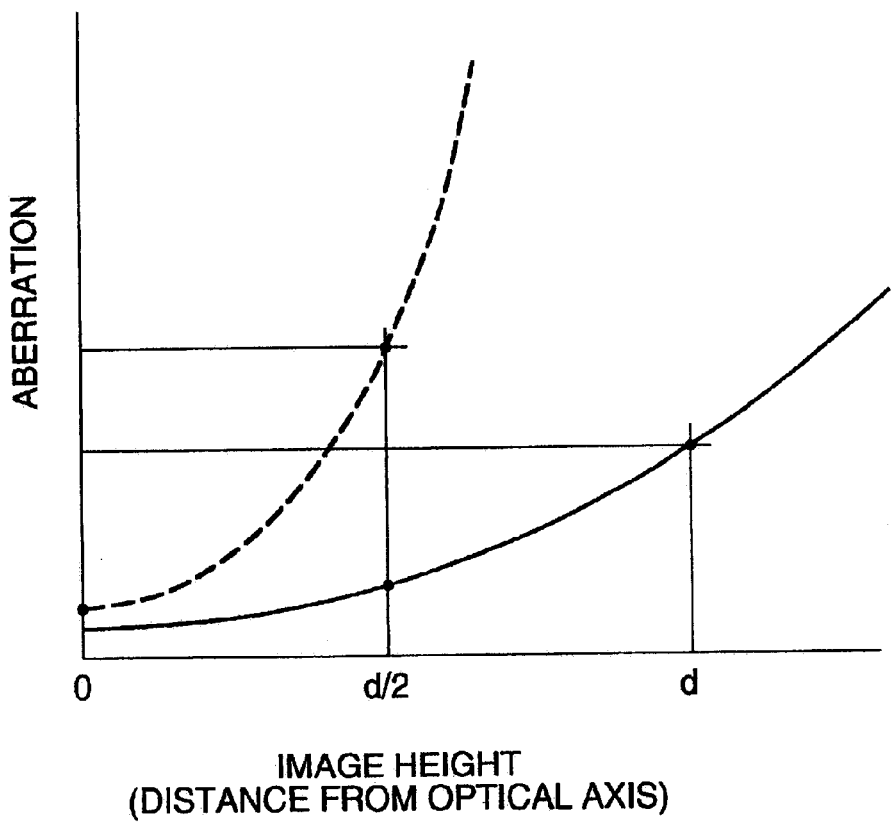
FIG. 5 is a diagram showing a relation between an image height and an aberration.

Also, FIG. 5 shows a relation between the image height and an aberration in reproducing a CD or a DVD. A dotted line shows a relation between the image height and the aberration in reproducing the DVD. A solid line shows a relation between the image height and the aberration in reproducing the CD.

As can be seen from FIG. 5, the aberration in reproducing the DVD is larger than the aberration in reproducing the CD regardless of the image height, and the proportion of an increase in the aberration in reproducing the DVD (slope of the dotted line) is larger than the proportion of an increase in the aberration in reproducing the CD (slope of the solid line). Also, even when the image height=0, namely the light emission point is placed on the optical axis, the aberration in reproducing the DVD is larger than the aberration in reproducing the CD. This is because numerical apertures of the objective lens are different corresponding to a wavelength of a laser beam used in reading. That is, in the DVD, a laser beam with a wavelength of 650 nm is read by using an objective lens with a numerical aperture of 0.6 and in the CD, a laser beam with a wavelength of 780 nm is read by using an objective lens with a numerical aperture of 0.45. Since the larger the numerical aperture of the lens is, the more difficult it becomes to design so as to reduce the aberration, the relation of the aberration shown in FIG. 5 occurs. As a result of that, the case of reading the laser beam with a short wavelength by the objective lens with a large numerical aperture as the DVD is subject to a bad influence due to a deviation of the image height compared with the case of reading the laser beam with a long wavelength by the objective lens with a small numerical aperture as the CD.

Hence, the optical pickup apparatus 100 of the invention is mainly characterized by using the beam splitter 52 having first and second half mirror functional surfaces 52b, 52c. The optical pickup apparatus 100 is constructed so that one of the first and second laser beams emitted from the semiconductor laser element 50, which does not match with the center axis of the objective lens, is passed through the two half mirror functional surfaces to match with the center axis of the objective lens.

Here, characteristics and configuration of the beam splitter 52 used in the embodiment will be described using FIGS. 6 and 7. Incidentally, FIG. 6 shows transmission/reflection characteristics of the first and second half mirror functional surfaces 52b, 52c of the beam splitter 52, and FIG. 7 shows a side structure view of the beam splitter 52.

A thin metal, such as aluminum or the like, is formed into a film shape as the first half mirror functional surface 52b on one surface of a transparent flat plate 52a, which is resin, glass, or the like, having excellent translucency, opposed to the semiconductor laser element 50, and a thin metal is formed into a film shape as the second half mirror functional surface 52c substantially parallel to the first half mirror functional surface 52b on the other surface, and the film thickness is adjusted, so that the beam splitter 52 obtains the transmission/reflection characteristics shown in FIG. 6.

As shown in FIG. 6A, the first half mirror functional surface 52b of the beam splitter 52 has transmission/reflection characteristics in which a wavelength (650 nm) of the first laser beam is transmitted 100% and both of a transmittance (T) and a reflectance (R) are 50% with respect to a wavelength (780 nm) of the second laser beam. Also, as shown in FIG. 6B, the second half mirror functional surface 52c of the beam splitter 52 has transmission/reflection characteristics in which a wavelength (780 nm) of the second laser beam is transmitted 100% and both of a transmittance (T) and a reflectance (R) are 50% with respect to a wavelength (650 nm) of the first laser beam.

Next, operations of deflecting an optical path of the first laser beam by the beam splitter 52 will be described using FIG. 7. FIG. 7 enlarges only a portion of the beam splitter 52 of the configuration diagram shown in FIG. 1 to show. Incidentally, since the beam splitter 52 is placed at an inclination (for example, about 45°) with respect to the two light emission windows 47, 48 of the semiconductor laser element 50, the first and second laser beams emitted from the semiconductor laser element 50 is incident at an inclination with respect to the surface opposed to the semiconductor laser element 50.

Figure 7A:
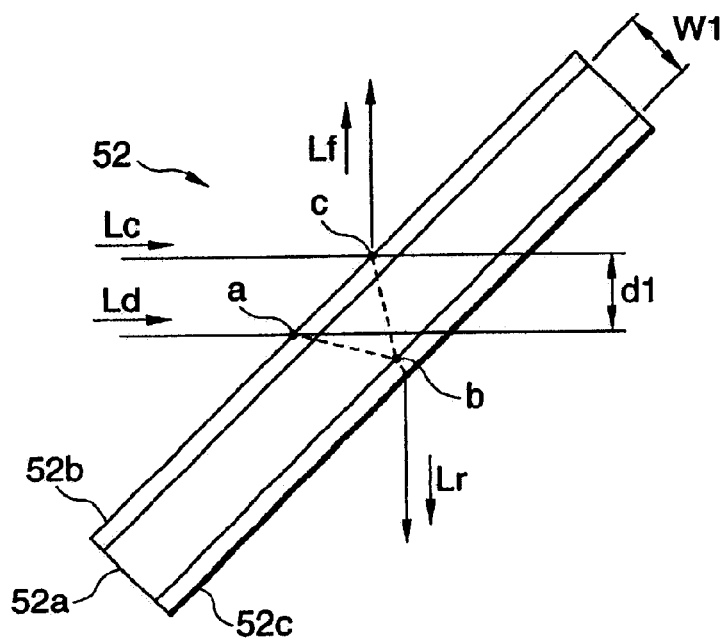
FIGS. 7A and 7B are enlarged views of the beam splitter used in the optical pickup apparatus of the invention.

As shown in FIG. 7A, emission light Ld (dotted line in the drawing) of the first laser beam emitted from the semiconductor laser element 50 is incident, for example, upon point a in the drawing of the first half mirror functional surface 52b of the beam splitter 52. Since the first half mirror functional surface 52b has the characteristics in which the first laser beam is transmitted 100% as described above, the first laser beam incident on the first half mirror functional surface 52b passes through the first half mirror functional surface 52b and the transparent flat plate 52a, and is refracted at a refractive index determined by materials such as resin, glass, or the like, and reaches, for example, point b in the drawing of the second half mirror functional surface 52c. Since the second half mirror functional surface 52c has the characteristics in which the first laser beam is transmitted 50% and is reflected 50%, a part of the first laser beam incident on the second half mirror functional surface 52c is reflected, and is emitted from, for example, point c in the drawing of the first half mirror functional surface 52b, and forms incident light Lf toward the center axis of the objective lens 54b.

On the other hand, emission light Lc (solid line in the drawing) of the second laser beam emitted from the semiconductor laser element 50 is incident, for example, upon point c in the drawing of the first half mirror functional surface 52b of the beam splitter 52. Since the first half mirror functional surface 52b has the characteristics in which the second laser beam is transmitted 50% and is reflected 50%, a part of the second laser beam incident on the first half mirror functional surface 52b is reflected to form incident light Lf toward the center axis of the objective lens 54b. That is, when the incident light Lf of the second laser beam is constructed to be incident upon point c of the first half mirror functional surface 52b, the incident light Lf of the second laser beam can be matched with the incident light Lf of the first laser beam.

Figure 7B:
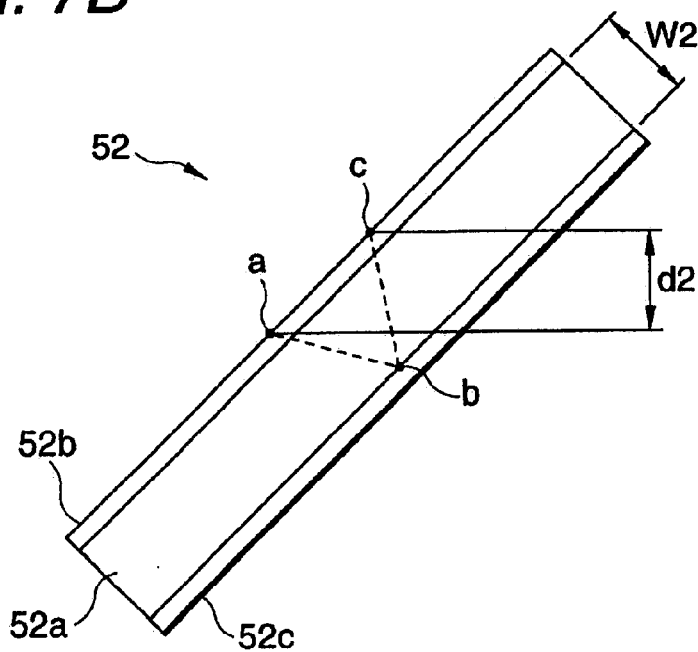

An optical path of the first laser beam being incident upon point a of the first half mirror functional surface 52b and being emitted from point c of the first half mirror functional surface 52b is determined by a refractive index and a plate thickness W of the transparent flat plate 52a constructing the beam splitter 52. For example, when a plate thickness of the transparent flat plate 52a is set at W1 as shown in FIG. 7A, it is assumed that a distance d1 is obtained as a distance between point a and point c of the first half mirror functional surface 52b. Next, when a plate thickness of the transparent flat plate 52a is set at W2 (W2>W1) thicker than W1 as shown in FIG. 7B, a distance d2 between point a and point c of the first half mirror functional surface 52b becomes longer than the distance d1 (d2>d1). Since a refractive index is uniquely determined by a material forming the transparent flat plate 52a, the distance d becomes wide as the plate thickness W is thickened and the distance d becomes narrow as the plate thickness W is thinned.

Hence, in the beam splitter 52 used in the embodiment, the plate thickness of the beam splitter 52 is set so that a distance d between point a on the first half mirror functional surface 52b, on which the first laser beam is incident, and point c on the first half mirror functional surface 52b, from which the first laser beam reflected on the second half mirror functional surface 52c is emitted, is equal to a distance (100 nm) between the first light emission part 36 and the second light emission part 40 of the semiconductor laser element 50.

Therefore, the first laser beam emitted from the first light emission part 36 passes through point a of the first half mirror functional surface 52b of the beam splitter 52 and is reflected at the second half mirror functional surface 52c and is emitted from point c of the first half mirror functional surface 52b and forms an optical path of incident light Lf toward the center axis of the objective lens 54b.

Also, the second laser beam emitted from the second light emission part 40 is reflected at point c of the first half mirror functional surface 52b and an optical path of incident light Lf toward the center axis of the objective lens 54b identical to that of the first laser beam is formed. That is, the optical path of incident light Lf of the first laser beam can be matched with that of the second laser beam by setting the material and the plate thickness of the transparent flat plate 52a. Thus, both of the first laser beam and the second laser beam can form the beam spot most suitable for an information record surface of the optical disk 55 without being affected by the aberration due to the image height.

Next, operations in case of reproducing the DVD and the CD as recording medium will be described referring FIG. 1. Incidentally, the optical pickup apparatus 100 according to the embodiment of the invention is constructed so as to conduct a disk determination similar to the related art and select to drive only one of the light emission sources of the semiconductor laser element 50 based on the disk determination result.

In case of reproducing an optical disk 55 of the DVD, emission light Ld (shown by a dotted line in the drawing) of the first laser beam emitted from the semiconductor laser element 50 is incident upon point a of the first half mirror functional surface 52b of the beam splitter 52 through the grating lens 51 and is reflected at the second half mirror functional surface 52c and is again emitted from point c of the first half mirror functional surface 52b and forms incident light Lf of the first laser beam. The incident light Lf of the first laser beam is incident upon the bifocal lens 54 after the incident light Lf is converted into a parallel flux of light by the collimator lens 53. The first laser beam incident on the bifocal lens 54 is diffracted to zero-order light, ±first-order light, and other high-orders light by a diffraction element 54a. Since the zero-order light is used for reproduction of the DVD, the objective lens 54b gathers the zero-order light of the first laser beam on an information record surface D of the optical disk 55.

Then, return light Lr of the first laser beam reflected at the information record surface D of the DVD passes through the bifocal lens 54 and the collimator lens 53 and is incident upon point c of the first half mirror functional surface 52b of the beam splitter 52, and a part of the return light Lr is emitted from point b of the second half mirror functional surface 52c and passes through the cylindrical lens 56 and is incident on the photodetector 60.

On the other hand, in the case of reproducing an optical disk 55 of the CD, emission light Lc (shown by a solid line in the drawing) of the second laser beam emitted from the semiconductor laser element 50 is incident upon point c of the first half mirror functional surface 52b of the beam splitter 52 through the grating lens 51 and a part of the emission light Lc is reflected and forms incident light Lf of the second laser beam. The incident light Lf of the second laser beam is incident on the bifocal lens 54 after the incident light Lf is converted into a parallel flux of light by the collimator lens 53. The second laser beam incident on the bifocal lens 54 is diffracted to zero-order light, ± first-order light and other high-orders light by the diffraction element 54a. Since any one of ± first-order light is used for reproduction of the CD, the objective lens 54b gathers ± first-order light of the incident light Lf of the second laser beam diffracted by the diffraction element 54a on an information record surface C of the optical disk 55.

Then, return light Lr of the second laser beam reflected at the information record surface C of the CD passes through the bifocal lens 54 and the collimator lens 53 and is incident on point c of the first half mirror functional surface 52b of the beam splitter 52, and a part of the return light Lr is transmitted and is emitted from point b of the second half mirror functional surface 52c and passes through the cylindrical lens 56 and is incident on the photodetector 60.

Figure 8:
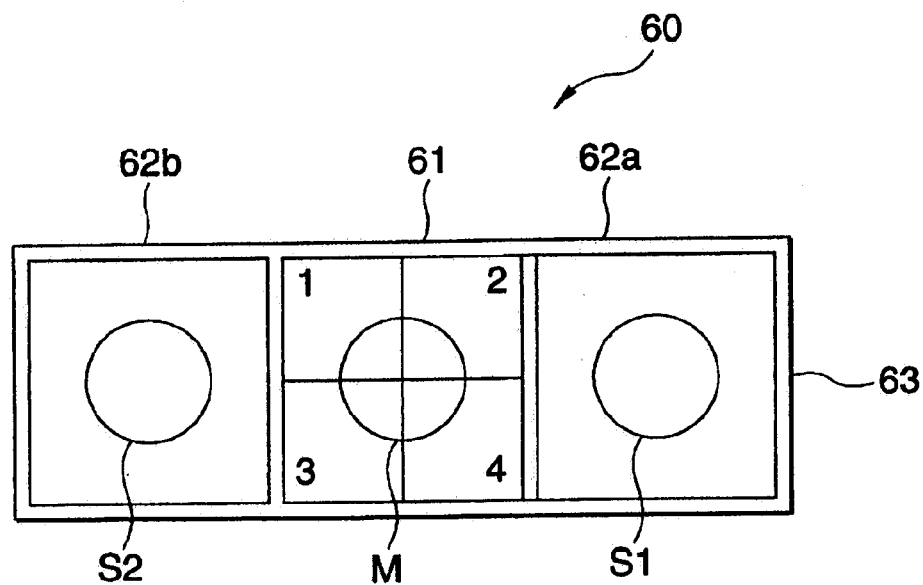
FIG. 8 is a plan view of a photodetector used in the optical pickup apparatus of the invention.

As shown in FIG. 8, the photodetector 60 is constructed in correspondence with a three-beam method and an astigmatism detection method. The photodetector 60 comprises a detection part 61, which is divided into four division areas 1, 2, 3, and 4, adapted to receive a main beam M of the first and second laser beams to generate a focus error FE signal, and two sub-detection parts 62a, 62b adapted to receive sub-beams S1, S2 of the first and second laser beams to be used for generation of a tracking error TE signal. The sub-detection parts 62a, 62b are disposed in both sides of the detection part 61 so as to sandwich the detection part 61, and each of the detection parts is provided on a substrate 63.

Figure 9:
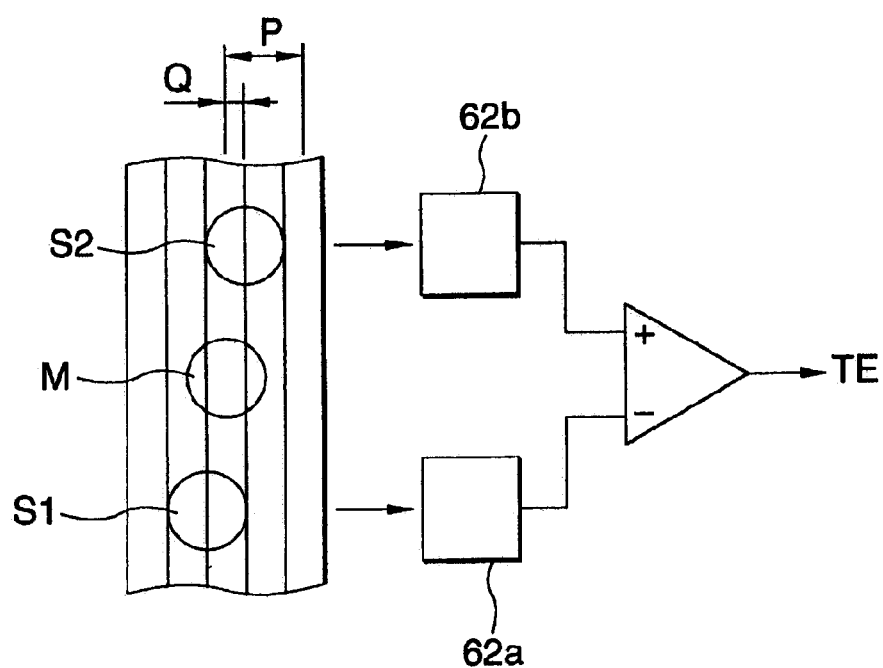
FIG. 9 is a diagram used for illustrating a three-beam method.

Next, a summary of the three-beam method and the astigmatism method used in the embodiment will be described on the basis of FIGS. 9 and 10. In the three-beam method, as shown in FIG. 9, two sub-beam spots S1, S2 are respectively offset by just Q in the reverse direction with respect to a main beam spot M. The offset amount Q is set to about one fourth of the track pitch P. There is a method in which reflected light by each the sub-beam spot S1, S2 is detected by the sub-detection parts 62a, 62b, respectively, and a difference between the detected outputs becomes the tracking error TE signal.

Figure 10A:
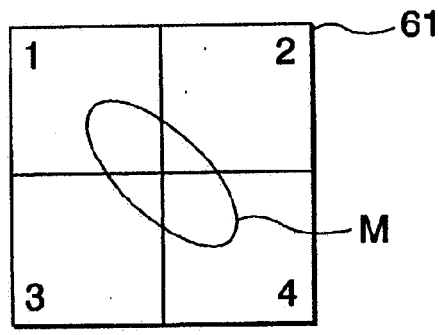
FIGS. 10A through 10C diagrams used for illustrating an astigmatism method.
Figure 10B:
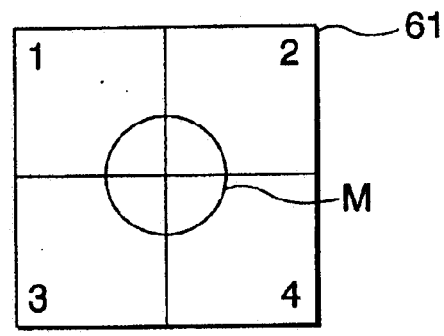
Figure 10C:
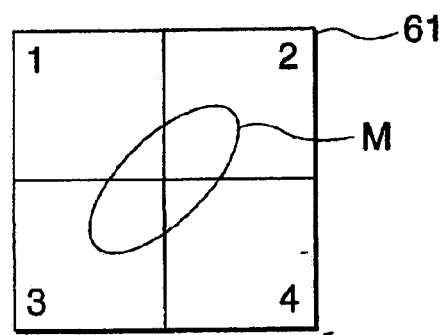

In the four division detection part 61 for performing the astigmatism method, as shown in FIG. 10B, when a beam spot is a complete circle shape, areas of the beam spot applied to light receiving parts, which are on diagonal lines each other, are equal to each other so that a component of the focus error FE signal is "0". Also, when focus is not achieved, according to astigmatism characteristics of the cylindrical lens 56, a beam spot with an elliptic shape is formed in a direction of the diagonal lines as shown in FIG. 10A or FIG. 10C. In this case, an area of the beam spot applied to the light receiving parts present on one of diagonal lines is different from an area of the light receiving parts present on the other of the diagonal lines and the focus error FE signal is output so as to have a value. Then, an electrical signal is supplied to a demodulation circuit and an error detection circuit corresponding to a spot image formed on each of four light receiving surfaces.

Figure 11:
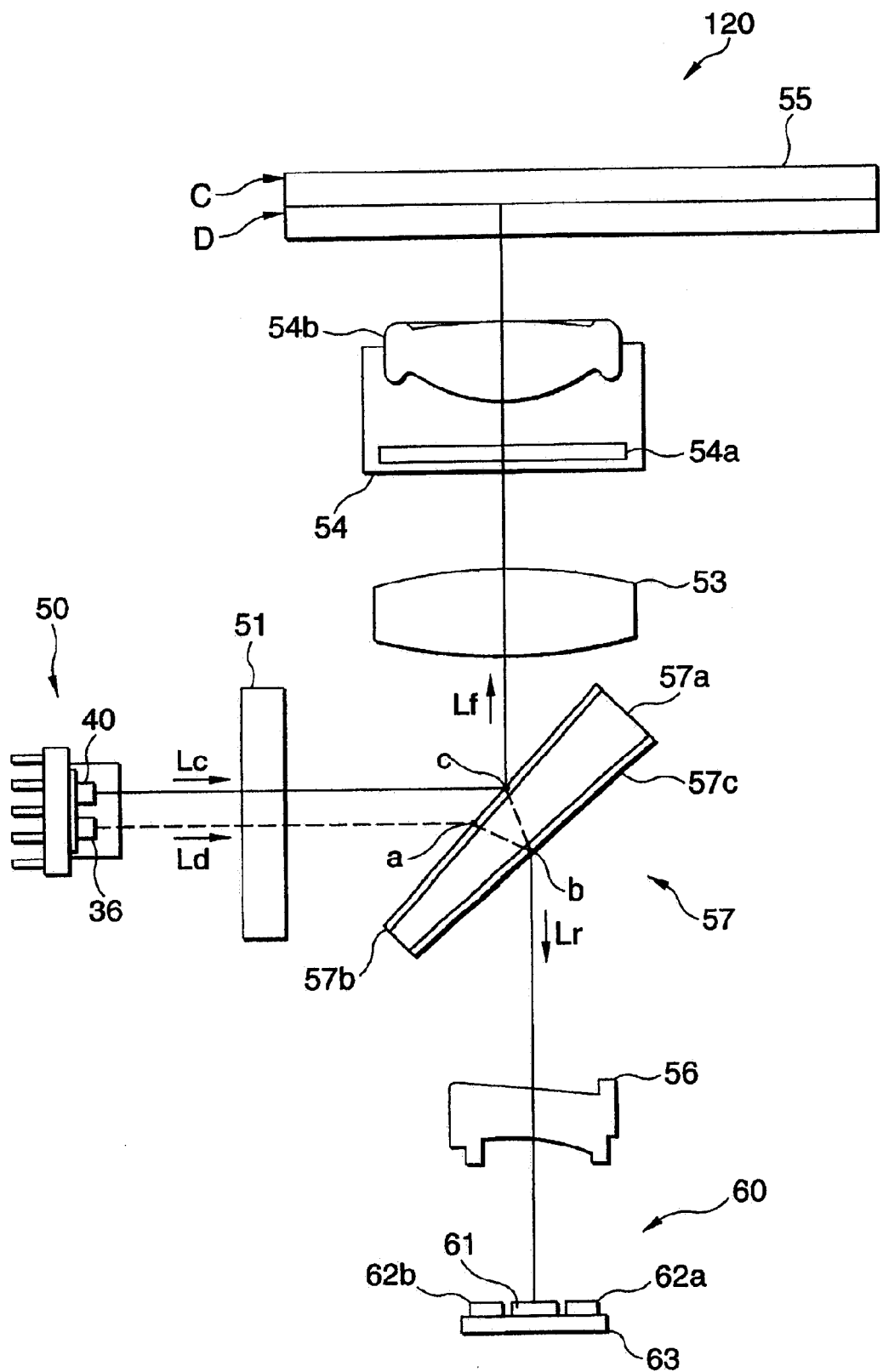
FIG. 11 is a configuration diagram of an optical pickup apparatus according to a second embodiment of the invention.

Next, an optical pickup apparatus 120 according to a second embodiment of the invention will be described referring to FIG. 11. The second embodiment differs in a configuration about a beam splitter 57 from the first embodiment. The other configurations of the second embodiment are identical to those of the first embodiment.

As described above, in the beam splitter 52 according to the first embodiment, the plate thickness of the beam splitter 52 is adjusted and set so that a distance d between point a on the first half mirror functional surface 52b on which the first laser beam is incident and point c on the first half mirror functional surface 52b, from which the first laser beam reflected on the second half mirror functional surface 52c is emitted, is equal to a distance between the first light emission part 36 and the second light emission part 40 of the semiconductor laser element 50. The beam splitter 57 according to this embodiment has a second half mirror functional surface 57c inclining with respect to a first half mirror functional surface 57b as shown in FIG. 11.

In the beam splitter 52 according to the first embodiment, the first half mirror functional surface 52b and the second half mirror functional surface 52c are formed on the transparent flat plate 52a, so that the distance d between point a and point c on the first half mirror functional surface 52b will be uniquely determined by the material and the plate thickness of the transparent flat plate 52a. However, in the beam splitter 57 according to the embodiment, an angle of inclination of the second half mirror functional surface 57c is adjusted in addition to an adjustment by the plate thickness of the transparent flat plate 52a according to the first embodiment, thereby enhancing flexibility in matching main beams of the first laser beam and the second laser beam. That is, flexibility in design of the beam splitter 57 can be increased.

Figure 12:
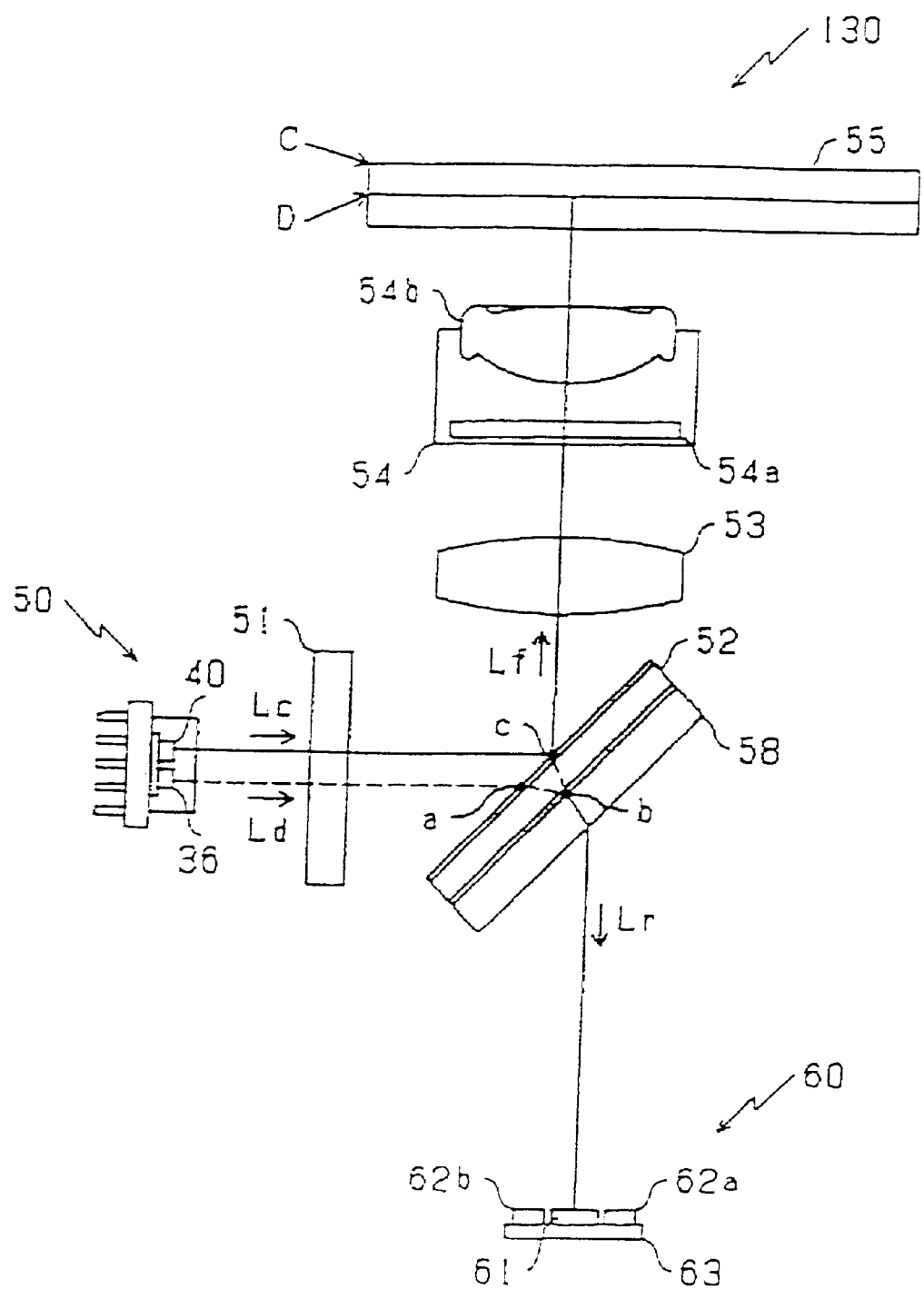
FIG. 12 is a configuration diagram of an optical pickup apparatus according to a third embodiment of the invention.

Next, an optical pickup apparatus 130 according to a third embodiment of the invention will be described referring to FIG. 12. FIG. 12 shows an applied example in which, with respect to the first embodiment shown in FIG. 1, a parallel flat plate 58 made of glass with good translucency is fixed on the second half mirror functional surface 52c of the beam splitter 52 and the cylindrical lens 56 is eliminated. Thus, the third embodiment is shown by a configuration in which the parallel flat plate 58 is closely placed on the beam splitter 52 and the cylindrical lens 56 is omitted with respect to the first embodiment shown in FIG. 1 and the other configurations are identical to those of the first embodiment.

Generally, light has characteristics of generating astigmatism when the light is incident on an inclination with respect to the parallel flat plate 58. Since the beam splitter 52 constructing the optical pickup apparatus 130 of the invention is placed at an inclination with respect to the objective lens 54b, when the parallel flat plate 58 is closely provided on the beam splitter 52 as shown in FIG. 12, a laser beam, which is reflected at an information record surface of the optical disk 55 and passes through the bifocal lens 54 and the collimator lens 53 and passes through the beam splitter 52, slantingly crosses the parallel flat plate 58 and astigmatism is provided to a main beam of the laser beam and the laser beam is applied to the photodetector 60. Thus, the effect similar to that of the first embodiment can be obtained even when the cylindrical lens 56 is omitted. Also, the parallel flat plate 58 is closely placed on the beam splitter 52, so that an optical system can be miniaturized.

The optical pickup apparatus according to each the embodiment of the invention described above has been constructed by an infinite optical system with divergent light converted into parallel light by using the collimator lens 53. However, the optical pickup apparatus according to the invention is not limited to this optical system and may be constructed by a finite optical system.

According to the invention, the beam splitter constructing the optical pickup apparatus is provided with the first and second half mirror functional surfaces so that any one of the first and second laser beams emitted from the light emission unit is reflected at the first half mirror functional surface to be guided toward a recording medium and the other of the laser beams passes through the first half mirror functional surface and is reflected at the second half mirror functional surface and further passes through the first half mirror functional surface to be guided toward the recording medium, and thereby an image height deviation of two wavelengths can be corrected without increasing the number of optical parts, and a compact and practical optical pickup apparatus in correspondence with two wavelengths can be obtained.

What is claimed is:

1. An optical pickup apparatus to read information of a plurality of recording mediums having different reading wavelengths from each other, the optical pickup apparatus comprising:

a light emission unit integrally including a first light emission source adapted to emit a first laser beam, and a second light emission source disposed adjacent to the first light emission source and adapted to emit a second laser beam whose wavelength is different from that of the first laser beam;

a photodetection unit; and a beam splitter having first and second half mirrors, wherein the beam splitter guides the first and second laser beams toward a recording medium and guides a reflected beam reflected at the recording medium toward the photodetection unit.

2. The optical pickup apparatus according to claim 1 wherein the first half mirror is disposed with respect to the second half mirrors so that:

the first laser beam emitted from the light emission unit is reflected at the first half mirror to be guided toward the recording medium; and the second laser beams emitted from the light emission unit passes the first half mirror, is reflected at the second half mirror, and passes through the first half mirror to be guided toward the recording medium.

3. The optical pickup apparatus according to claim 1, wherein the first and second laser beam between the beam splitter and the recording medium have the same optical path.

4. The optical pickup apparatus according to claim 1, wherein the first and second half mirrors are inclined with respect to the first and second laser beams emitted from the light emission unit.

5. The optical pickup apparatus according to claim 1, wherein the first and second half mirrors are substantially parallel to each other.

6. The optical pickup apparatus according to claim 1, wherein the first and second laser beams reflected at the recording medium passes through the first half mirror and passes through the second half mirror to be guided toward the photodetection unit.

7. The optical pickup apparatus according to claim 1, wherein a parallel flat plate adapted to provide astigmatism to the first and second laser beams reflected at the recording medium is fixed to the second half mirror.

8. An optical pickup apparatus, comprising:
a light emission unit unitarily including a first light emission source and a second light emission source, wherein the first light emission source is adapted to emit a first light beam and the second light emission source is adapted to emit a second light beam whose wavelength is different from that of the first laser beam;
a photodetection unit; and
a beam splitter having first and second half mirrors, wherein the beam splitter guides the first and second light beams toward a recording medium and guides a reflected beam reflected at the recording medium toward the photodetection unit.

9. The optical pickup apparatus according to claim 8, wherein the first light emission source and the second light emission source are supported by a common substrate.

10. The optical pickup apparatus according to claim 8, wherein the first light beam is a first laser, and wherein the second light beam is a second laser beam.

11. The optical pickup apparatus according to claim 8, wherein the first light emission source is disposed adjacent to the second light emission source.

* * * * *